United States Patent [19]

Saathoff et al.

[11] 4,228,227
[45] Oct. 14, 1980

[54] RECHARGEABLE ELECTROCHEMICAL CELL

[75] Inventors: Deidrich J. Saathoff, Eagan; Hanumanthiyna V. Venkatasetty, Burnsville, both of Minn.

[73] Assignee: Honeywell Inc., Minneapolis, Minn.

[21] Appl. No.: 66,154

[22] Filed: Aug. 13, 1979

[51] Int. Cl.³ .......................................... H01M 10/40
[52] U.S. Cl. .................................... 429/194; 429/199
[58] Field of Search ................ 429/194, 199, 196, 197

[56] References Cited

U.S. PATENT DOCUMENTS 3,928,067  12/1975  Broadhead et al. ................ 429/194
3,945,848  3/1976  Dey et al. ........................ 429/199 X

*Primary Examiner*—Anthony Skapars
*Attorney, Agent, or Firm*—John S. Munday

[57] ABSTRACT

An electrolyte for use in rechargeable electrochemical cells having a lithium electrode and a depolarizer which includes an electrochemically active amount of $LiAsF_6$ dissolved in tetrahydrofuran and a rechargeability improving amount of LiI contained therein to form an electrolyte solution, said solution being capable of passing through a molecular sieve of less than 5 Angstroms. A preferred embodiment includes a 1 molar solution of the $LiAsF_6$ and from about 0.8 to 1.4 molar solution of LiI.

5 Claims, No Drawings

RECHARGEABLE ELECTROCHEMICAL CELL

BACKGROUND OF THE INVENTION

Lithium batteries have become useful in many commercial applications due to the high energy availability between the lithium anode and the variety of cathodes employed in lithium batteries. By far the greatest portion of the lithium battery industry, however, is in the primary active batteries. Lithium batteries have demonstrated a high degree of shelf life and these batteries are becoming accepted as reliable power sources.

However, one of the main concerns about lithium batteries is the relatively high cost of manufacture. In many instances, the high energy and substantially longer life does not justify the expense of lithium batteries. This is particularly true when alternate power sources such as rechargeable batteries can be employed. Lithium battery power cost is excessive when compared to rechargeable batteries.

In order to further develop the lithium battery industry, what is particularly needed is a lithium battery which is capable of operating on a secondary mode. Rechargeable lithium batteries would have the inherent high energy and long life capabilities of their primary versions while eliminating the excessive high cost due to replacement. One of the major problems to be solved in lithium rechargeable electrochemical power sources, however, is the improvement of electrolyte solution with suitable additives from which lithium can be deposited and dissolved and redeposited with efficiency. Stated another way, if the lithium battery cannot be recharged more than a few times and at only a relatively poor efficiency, it is not an effective substitute for other rechargeable cells. Another problem which arises in conventional prior art lithium rechargeable batteries is that the electrodeposited lithium is more reactive towards the solvent and/or the electrolyte solution than is the bulk lithium comprising the lithium electrode. Thus, the lithium recovery efficiency is very low on wet stand.

Accordingly, it is an object of this invention to provide a rechargeable lithium battery which is capable of repeated cycling with high efficiency of redeposition.

Another object of this invention is to provide a lithium battery which is rechargeable and which has an improved recovery efficiency on wet stand.

Other objects will appear hereinafter.

THE INVENTION

It has now been discovered that the above and other objects of the present invention can be accomplished in the following manner. Specifically, a new electrolyte has been discovered which is highly suitable for use in rechargeable electrochemical cell having a lithium anode and a depolarizer.

The electrolyte comprises an electrochemically active amount of $LiAsF_6$ dissolved in tetrahydrofuran. The electrolyte further contains a rechargeability improving amount of LiI. The electrolyte solution is passed through a molecular sieve having a pore diameter of less than about 5 Angstroms to remove trace water.

As stated above, an electrochemically active amount of lithium of $LiAsF_6$ is employed. Normally, this amount ranges from about 0.2 molar to about 2.0 molar $LiAsF_6$ in tetrahydrofuran. Most preferred is a solution of about 1.0 molar $LiAsF_6$.

The rechargeability improving amount of LiI may range from as little as 0.1 molar to as much as 0.35 molar, although more LiI could be employed without departing from the spirit of the present invention. The preferred range of the LiI is from about 0.8 molar to about 1.4 molar.

The purpose of passing the electrolyte solution through a molecular sieve is to remove any trace of water and to insure proper solubility of respective salt employed in the electrolyte.

The electrolyte is admirably suited for use in rechargeable electrochemical cell having a lithium anode. A wide variety of cathodes or depolarizers may be employed and it is contemplated that any depolarizer which is electrochemically compatible with the lithium anode in the electrolyte solution should be employed in the present invention. Specific examples of suitable depolarizers are: titaniumdisulfide ($TiS_2$), vanadium pentoxide ($V_2O_5$), niobium selenide ($NbSe_3$), $Na_{.18}TiS_2$, $Na_{.18}TaS_2$, and the like. Other cathodes or depolarizers which can be employed are set forth by way of example in U.S. Pat. No. 3,423,242.

In order to demonstrate the efficiencies of the present invention, a number of experiments were performed to determine the efficiency of the rechargeability feature of the electrolyte. Plating cells were constructed in the laboratory to determine the relative efficiency of deposition and dissolution of lithium on nickel substrate. Lithium counter electrodes and lithium reference electrodes were used. In each experiment, the procedures were performed in the same manner, with the only difference being the composition of the electrolyte solution.

In the first experiment, a one molar solution of $LiAsF_6$ in tetrahydrofuran was employed. It had a 70 percent efficiency for lithium deposition and dissolution on a nickel substrate. On cycling the efficiency decreased to 42 percent.

In the second experiment, a one molar solution of $LiAsF_6$ in tetrahydrofuran was employed which further contained 0.8 molar LiI and was treated with a 5 Angstrom molecular sieve. This superior efficiency of 75 percent for lithium deposition and dissolution demonstrates the surprising and effective results of the present invention. On cycling, the efficiency did not change. On wet stand for 800 seconds efficiency was better than 60 percent.

Similarly, a third experiment with an electrolyte solution of one molar $LiAsF_6$ in tetrahydrofuran was employed, containing 1.4 molar LiI, again with a 5 Angstrom molecular sieve treatment. The efficiency for this experiment was 80 percent, once again demonstrating the surprising and superior results achieved by the present invention. On cycling, the efficiency was 75-80 percent and on wet stand for 800 seconds, efficiency was 70 percent.

In articles written by R. D. Rauh and S. B. Brummer et al in the Journal of ElectrochemActa 22, 75 (1977) and page 85 of the same volume, several proposed electrochemical systems were set forth for lithium cycling efficiency. In a one molar solution of $LiClO_4$ in propylene carbonate with a 0.1 M to 3.7 M addition of nitromethane, cycling efficiency was approximately 75 percent and on cycling after about 800 seconds, it decreased to 55-35 percent.

As has been stated above, the present invention provides an electrolyte for use in a rechargeable electrochemical cell which permits a high degree of efficiency in lithium plating and dissolution. Other experiments measuring the recovery efficiency on wet stand for periods of time up to 800 seconds demonstrates an efficiency of about 70 percent. Without the use of the LiI, efficiencies were only 23 percent.

Having thus described the invention, what is claimed is:

1. An electrolyte for use in rechargeable electrochemical cells having a lithium and a depolarizer, comprising: an electrochemically active amount of $LiAsF_6$ dissolved in tetrahydrofuran and a rechargeability improving amount of LiI contained therein to form an electrolyte solution, said solution being capable of passing through a molecular sieve on less than 5 Angstroms.

2. The cell of claim 1 wherein the amount of $LiAsF_6$ ranges from 0.2 molar to 2.0 molar.

3. The cell of claim 2 wherein the amount of $LiAsF_6$ range is approximately 1.0 molar.

4. The cell of claim 1 wherein the amount of LiI ranges from 0.1 to 0.35 molar.

5. The cell of claim 4 when the amount of LiI ranges from 0.8 to 1.4 molar.

* * * * *